(12) United States Patent
Suzuki et al.

(10) Patent No.: US 8,953,270 B2
(45) Date of Patent: Feb. 10, 2015

(54) LIBRARY DEVICE, CONTROL METHOD AND PROGRAM

(75) Inventors: Takeshi Suzuki, Tokyo (JP); Toru Yoshida, Tokyo (JP)

(73) Assignee: NEC Platforms, Ltd., Tokyo (JP)

( * ) Notice: Subject to any disclaimer, the term of this patent is extended or adjusted under 35 U.S.C. 154(b) by 362 days.

(21) Appl. No.: 13/636,424

(22) PCT Filed: Mar. 3, 2011

(86) PCT No.: PCT/JP2011/054996
§ 371 (c)(1),
(2), (4) Date: Sep. 21, 2012

(87) PCT Pub. No.: WO2011/118363
PCT Pub. Date: Sep. 29, 2011

(65) Prior Publication Data
US 2013/0057979 A1 Mar. 7, 2013

(30) Foreign Application Priority Data
Mar. 24, 2010 (JP) .................................. 2010-068020

(51) Int. Cl.
*G11B 15/68* (2006.01)
*G11B 17/22* (2006.01)

(52) U.S. Cl.
CPC ............ *G11B 17/225* (2013.01); *G11B 15/689* (2013.01); *G11B 15/6835* (2013.01); *G11B 17/228* (2013.01)
USPC .............................................. 360/55; 360/69

(58) Field of Classification Search
None
See application file for complete search history.

(56) References Cited

U.S. PATENT DOCUMENTS

| | | | | |
|---|---|---|---|---|
| 4,527,262 A | * | 7/1985 | Manto | 369/30.43 |
| 6,005,734 A | * | 12/1999 | Shimada et al. | 360/69 |
| 6,005,745 A | * | 12/1999 | Filkins et al. | 360/92.1 |
| 6,008,964 A | * | 12/1999 | Goodknight et al. | 360/69 |
| 6,612,499 B2 | * | 9/2003 | Ellis et al. | 235/486 |
| 7,107,121 B2 | * | 9/2006 | Fisher et al. | 700/229 |
| 7,123,436 B2 | * | 10/2006 | Shimanuki | 360/69 |
| 2010/0200524 A1 | | 8/2010 | Suzuki et al. | |

FOREIGN PATENT DOCUMENTS

| | | |
|---|---|---|
| JP | 1-313762 A | 12/1989 |
| JP | 11-149696 A | 6/1999 |
| JP | 2008-217938 A | 9/2008 |
| WO | 2009/041375 A1 | 4/2009 |

\* cited by examiner

Primary Examiner — Wayne Young
Assistant Examiner — James L Habermehl
(74) Attorney, Agent, or Firm — Sugrue Mion, PLLC

(57) ABSTRACT

A library device in which, even if the relation between the number of pulses of a stepping motor and an encoder count number changes, a movement distance of a medium transfer means can be verified by an encoder count number counted by an encoder sensor is provided.

A control means (2) determines a proof factor used when calculating an assumed encoder count number assumed based on the number of pulses according to a movement distance of a medium transfer means (5). When a movement distance of the medium transfer means (5) is verified, an assumed encoder count number, which is assumed based on the above-mentioned determined proof factor and the number of pulses according to the movement distance of the medium transfer means (5), and an actual encoder count number, which is counted by an encoder sensor when a stepping motor is driven by the number of pulses according to the movement distance of medium transfer means (5), are compared.

9 Claims, 8 Drawing Sheets

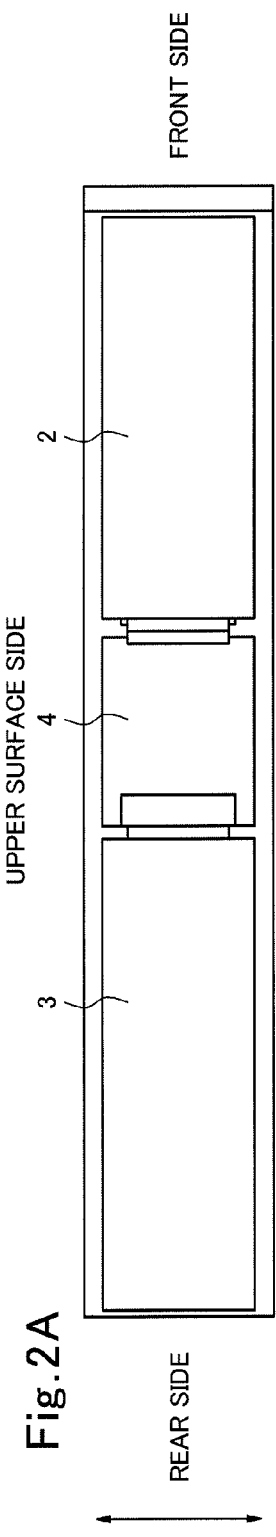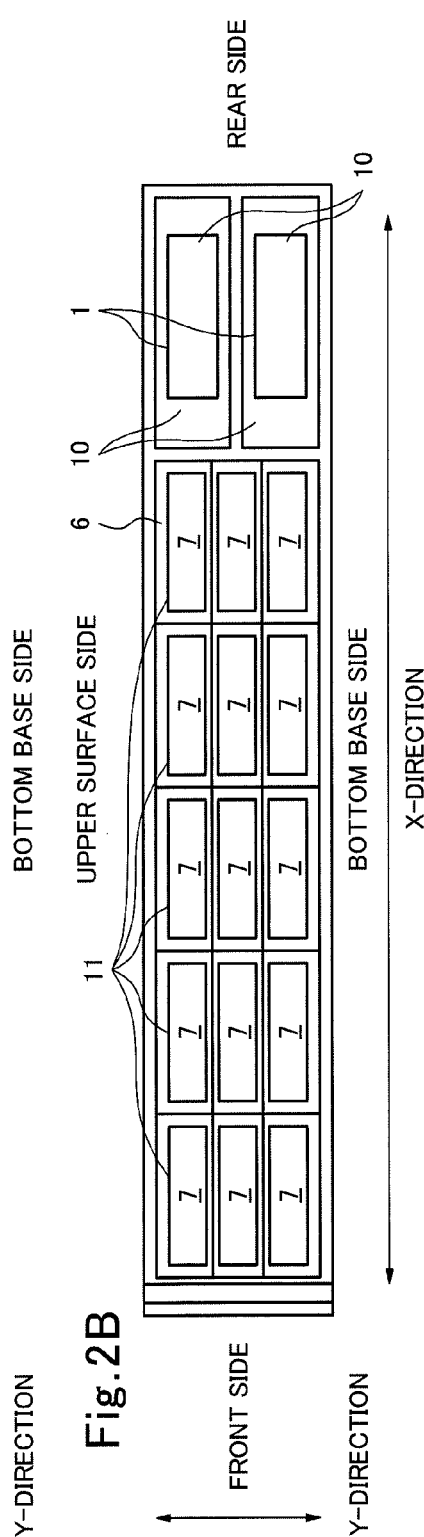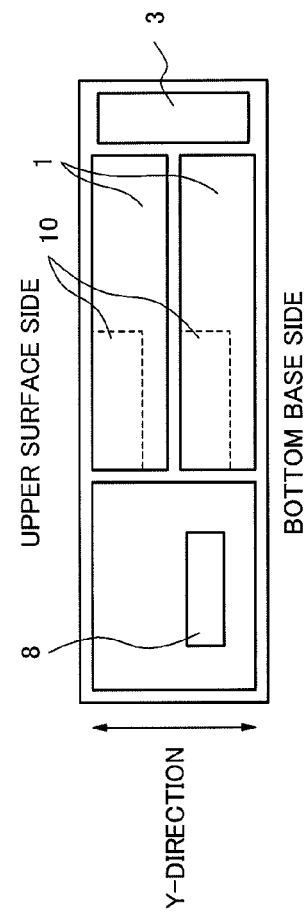

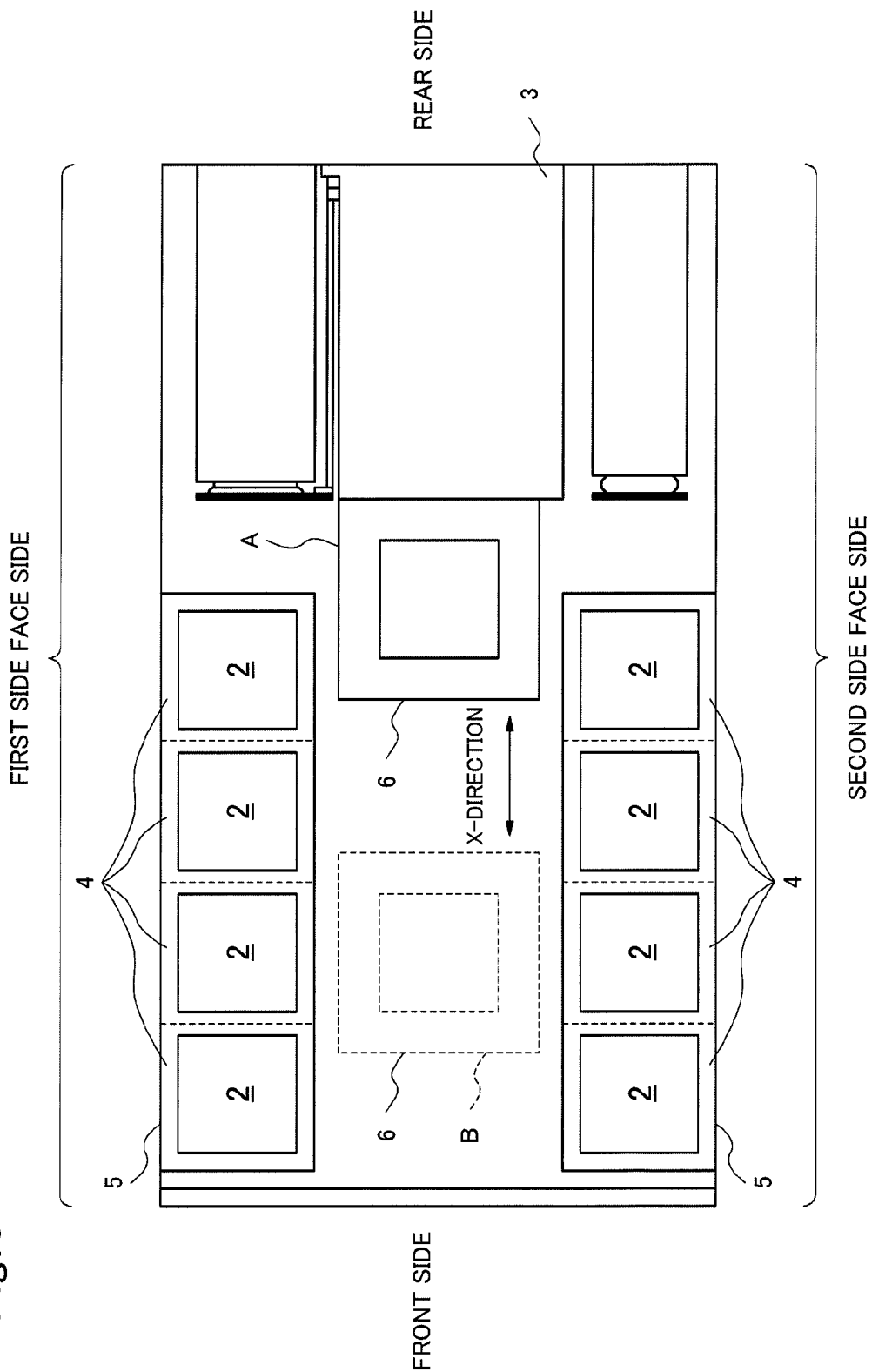

LIBRARY DEVICE, CONTROL METHOD AND PROGRAM

CROSS REFERENCE TO RELATED APPLICATIONS

This application is a National Stage of International Application No. PCT/JP2011/054996 filed Mar. 3, 2011, claiming priority based on Japanese Patent Application No. 2010-068020 filed Mar. 24, 2010, the contents of all of which are incorporated herein by reference in their entirety.

TECHNICAL FIELD

The present invention relates to a library device.

BACKGROUND ART

As a general library device, there is an instance having a configuration disclosed in patent document 1 (Japanese Patent Application Laid-Open No. 2008-217938), for example.

As shown in FIG. 7, a library device 1 of patent document 1 is configured including: a medium storing means (cartridge magazine 5) having a cell 4 which individually stores a plurality of media (data cartridge 2) storing various kinds of information; a medium reading and writing means (drive device 3) that loads the data cartridge 2, to read and write information; and a medium transfer means (accessor mechanism 6) for accessing a predetermined cell 4, to put in or take out the data cartridge 2, or putting in or taking out a data cartridge into/from the predetermined drive device 3, and the like.

Furthermore, there is an instance, which controls a move of the accessor mechanism 6, as shown in FIG. 7 (a move in X-direction or Y-direction shown in FIG. 7) using a stepping motor.

When the move of the accessor mechanism 6 as shown in FIG. 7 (in X-direction shown in FIG. 7, for example) is controlled using the stepping motor, the accessor mechanism 6 will move by a distance according to a number of pulses of the stepping motor (a movement distance of the accessor mechanism 6=the number of pulses of the stepping motor*a movement distance that the accessor mechanism 6 can move by one pulse). For this reason, as shown in FIG. 8, when the accessor mechanism 6 is desired to be moved to a specific designated position (the position of B in FIG. 8) from the home position (the position of A in FIG. 8), for example, it is possible to move the accessor mechanism 6 from the home position A to the designated position B by driving the stepping motor by the number of pulses according to the movement distance from the home position A to the designated position B. FIG. 8 shows an example of moving the accessor mechanism 6 shown in FIG. 7 in X-direction using the stepping motor.

However, when a step-out or the like occurs to the stepping motor, although the accessor mechanism 6 does not move, only the number of pulses of the stepping motor is counted. For this reason, when the step-out or the like occurs to the stepping motor, the number of pulses of the stepping motor and the movement distance of the accessor mechanism 6 do not synchronize, and thus, even if the stepping motor are driven by the number of pulses according to the movement distance from the home position A to the designated position B, the accessor mechanism 6 could not be moved from the home position A to the designated position B.

For this reason, there is an instance, in which the accessor mechanism 6 is moved using the stepping motor and the movement distance of the accessor mechanism 6 can be verified with an encoder count number counted by an encoder sensor. In this case, the number of pulses of the stepping motor and the encoder count number counted by the encoder sensor will be made to have a correlation. Specifically, it is made such that the encoder count number counted by the encoder sensor when the stepping motor is driven by the predetermined number of pulses (an actual encoder count number) will be an assumed encoder count number obtained by multiplying the predetermined number of pulses by a proof factor (the predetermined number of pulses*the proof factor). That is, it is made such that the assumed encoder count number (the predetermined number of pulses*the proof factor)=the actual encoder count number.

In this case, when the accessor mechanism 6 is desired to be moved from the home position A to the designated position B, the stepping motor is driven by the number of pulses according to the movement distance from the home position A to the designated position B, and, at the same time, the encoder count number which has been counted by the encoder sensor until the stepping motor is driven by that number of pulses is checked. Then, it is confirmed whether or not there is a correlation between the number of pulses of the stepping motor and the encoder count number (whether they satisfy a relation that the number of pulses of the stepping motor*proof factor=actual encoder count number), and, when there is a correlation between the number of pulses of the stepping motor and the encoder count number (when they satisfy the relation that the number of pulses of a stepping motor*proof factor=actual encoder count number), it is determined that the accessor mechanism 6 has moved to the designated position B. When there is no correlation between the number of pulses of the stepping motor and an encoder count number (when they do not satisfy the relation that the number of pulses of the stepping motor*proof factor=actual encoder count number), it is determined that the accessor mechanism 6 has not moved to the designated position B. As a result, it is possible to move the accessor mechanism 6 using the stepping motor, and check the movement distance of the accessor mechanism 6 by the encoder count number counted by the encoder sensor.

However, there is a case where, by any extrinsic factors, the relation between the number of pulses of the stepping motor and the encoder count number (the relation that the number of pulses of the stepping motor*proof factor=actual encoder count number) is changed, and, as a result, it becomes impossible to check the movement distance of the accessor mechanism 6 any more by the encoder count number counted by the encoder sensor. As the extrinsic factor, a case where the module of gears, of which the accessor mechanism 6 is composed, has been changed or the like is mentioned.

For this reason, development for a mechanism, which can confirm the movement distance of the accessor mechanism 6 by the encoder count number counted by the encoder sensor even if the relation between the number of pulses of the stepping motor and the encoder count number (the relation that the number of pulses of a stepping motor*proof factor=actual encoder count number) is changed, is needed.

Meanwhile, as a technical document filed prior to the present invention, there is a literature which discloses a technology which can perform, when there is a change in a structure of a library device, processing to update location information on all frames easily in a short time by limiting such cases (for example, refer to patent document 2).

In the above-mentioned patent document 2, in a case where an accessor or an accessor component of a library device is replaced, by the accessor before the replacement, position control information for a standard unit is measured in advance and is made to be first position control information, and, in addition, position control information for each frame is measured in advance and is made to be second position control information. Next, position control information for the standard unit is measured by the accessor after the replacement and is made be third position control information. Then, a difference value between the first position control information and the third position control information is obtained, then the second position control information is corrected by the difference value and is made to be fourth position control information. Then, the operation of the accessor after the replacement will be controlled based on the fourth position control information.

CITATION LIST

Patent Literature

[Patent Literature 1] Japanese Patent Application Laid-Open No. 2008-217938
[Patent Literature 2] Japanese Patent Application Laid-Open No. 1999-149696

SUMMARY OF INVENTION

Technical Problem

It is disclosed, in the above-mentioned patent literature 2, regarding a point of updating position control information on each frame and each cell of a library device after a replacement and controlling, operations of an accessor after the replacement.

However, there is neither description nor suggestion at all in the above-mentioned patent literature 2 about a mechanism for verifying the movement distance of the accessor mechanism, which is a medium transfer means, by the encoder count number counted by the encoder sensor even if the relation between the number of pulses of the stepping motor and the encoder count number (the relation that the number of pulses of a stepping motor*proof factor=actual encoder count number) changes.

The present invention has been made in view of the above-mentioned circumstances, and the object is to provide a library device, a control method and a program which can verify a movement distance of a medium transfer means by an encoder count number counted by an encoder sensor even if the relation between a number of pulses of a stepping motor and an encoder count number (the relation that the number of pulses of a stepping motor*proof factor=actual encoder count number) changes.

Solution to Problem

In order to achieve the above object, the present invention has the following feature.

A library device according to the present invention, comprises: a medium storing means for accommodating a plurality of computer-readable media; a medium reading and writing means for performing at least one of reading information stored in said medium and writing information in said medium; a medium transfer means for transferring said medium between said medium storing means and said medium reading and writing means; and a control means for controlling said medium transfer means, wherein said control means includes: a movement control means for moving said medium transfer means by driving a stepping motor by a number of pulses according to a movement distance of said medium transfer means; a verifying means for comparing an actual encoder count number counted, upon said stepping motor having been driven by said number of pulses, by an encoder sensor according to a movement of said medium transfer means, and an assumed encoder count number assumed based on said number of pulses; and an adjustment means for determining a proof factor used at a time of calculating the assumed encoder count number assumed based on said number of pulses.

A library device according to the present invention comprises: a medium storing means for accommodating a plurality of computer-readable media; a medium reading and writing means for performing at least one of reading information stored in said medium and writing information in said medium; a medium transfer means for transferring said medium between said medium storing means and said medium reading and writing means; and a control means for moving said medium transfer means by driving a stepping motor by a number of pulses according to a movement distance of said medium transfer means, wherein said control means includes: an adjustment means for determining, upon accepting an adjustment instruction, a proof factor used at a time of calculating an assumed encoder count number assumed based on the number of pulses according to the movement distance of said medium transfer means; and a verifying means for comparing, upon verifying said movement distance of said medium transfer means, the assumed encoder count number assumed based on said proof factor determined by said adjustment means and the number of pulses according to the movement distance of said medium transfer means, and an actual encoder count number counted, upon said stepping motor having been driven by the number of pulses according to the movement distance of said medium transfer means, by an encoder sensor.

A control method according to the present invention is a control method carried out in a library device, configured comprising a medium storing means for accommodating a plurality of computer-readable media, a medium reading and writing means for performing at least one of reading information stored in said medium and writing information in said medium, a medium transfer means for transferring said medium between said medium storing means and said medium reading and writing means, and a control means for controlling said medium transfer means, wherein said control means carrying out: a movement control step of moving said medium transfer means by driving a stepping motor by a number of pulses according to a movement distance of said medium transfer means; a verifying step of comparing an actual encoder count number counted, upon said stepping motor having been driven by said number of pulses, according to a movement of said medium transfer means, and an assumed encoder count number assumed based on said number of pulses; and an adjusting step of determining a proof factor used at a time of calculating the assumed encoder count number assumed based on said number of pulses.

A program according to the present invention is a program to be executed by a library device, configured comprising a medium storing means for accommodating a plurality of computer-readable media, a medium reading and writing means for performing at least one of reading information stored in said medium and writing information in said medium, a medium transfer means for transferring said medium between said medium storing means and said medium reading and writing means, and a control means for controlling said medium transfer means, said program causing said control means to execute: movement control processing for moving said medium transfer means by driving a stepping motor by a number of pulses according to a movement distance of said medium transfer means; a verifying processing for comparing an actual encoder count number counted, upon said stepping motor having been driven by said number of pulses, according to a movement of said medium transfer means, and an assumed encoder count number assumed based on said number of pulses; and an adjusting processing for determining a proof factor used at a time of calculating the assumed encoder count number assumed based on said number of pulses.

Advantageous Effect of Invention

According to the present invention, even if the relation between the number of pulses of the stepping motor and the encoder count number (the relation that the number of pulses of a stepping motor*proof factor=actual encoder count number) changes, the movement distance of the medium transfer means can be verified by the encoder count number counted by the encoder sensor.

BRIEF DESCRIPTION OF DRAWINGS

FIG. 2 is a side view and a rear view showing the exemplary configuration of the library device 100 according to the present exemplary embodiment.

FIG. 8 is a diagram showing an example of controlling the movement of the accessor mechanism 6 shown in FIG. 7 using the stepping motor.

DESCRIPTION OF EMBODIMENTS

<Outline of the Library Device 100 According to the Present Exemplary Embodiment>

First, the outline of the library device 100 according to the present exemplary embodiment will be described with reference to FIG. 1, FIG. 3 and FIG. 4.

Figure 1:
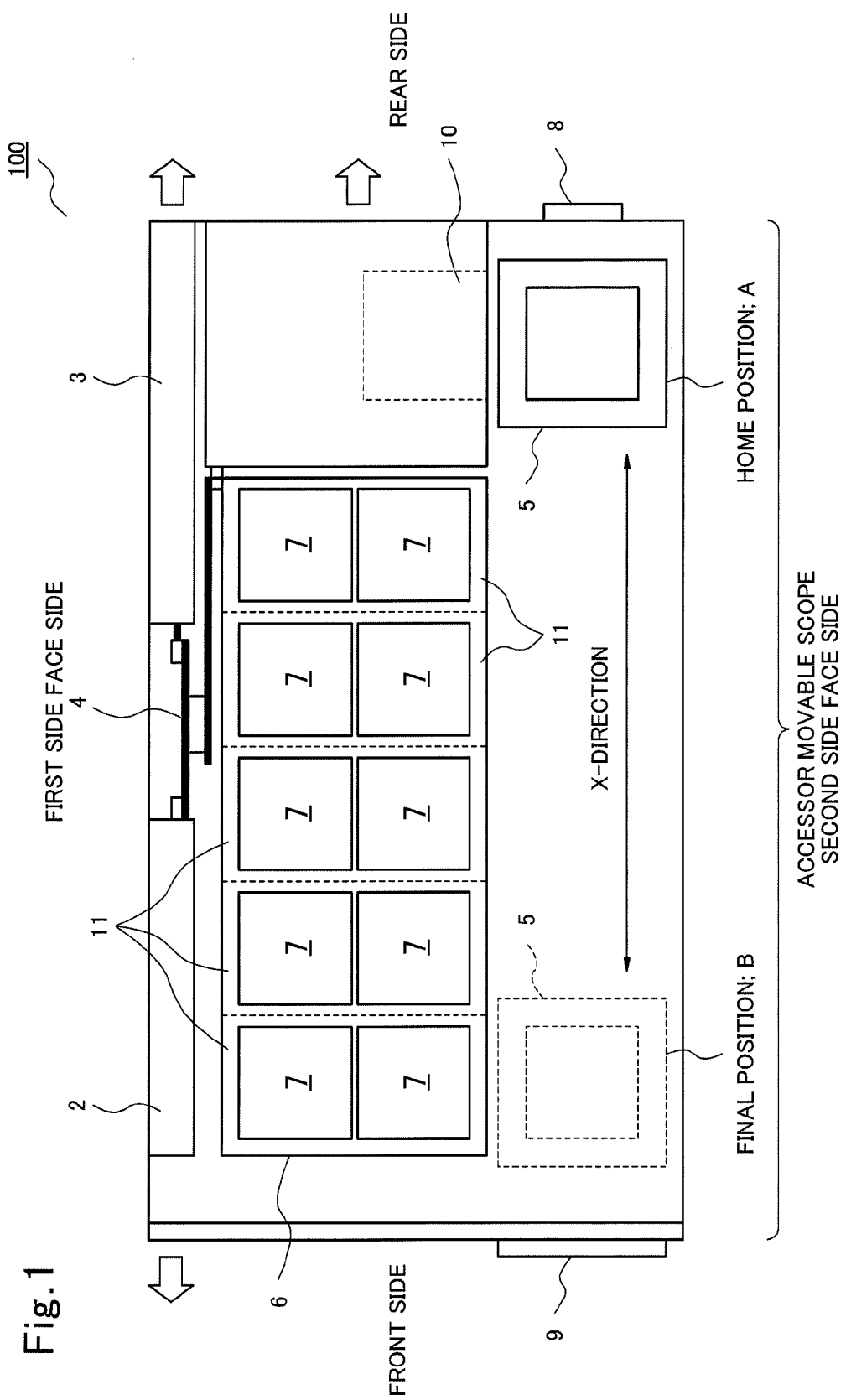
FIG. 1 is a top view showing an exemplary configuration of a library device 100 according to the present exemplary embodiment.

As shown in FIG. 1, the library device 100 according to the present exemplary embodiment is configured including: a medium storing means (corresponding to a magazine 6) which can accommodate plural computer readable medium 7; a medium reading and writing means (corresponding to a drive device 1) which performs at least one of reading information stored in the medium 7 and writing information to the medium 7; a medium transfer means (corresponding to an accessor mechanism 5) which transfers the medium 7 between the medium storing means 6 and the medium reading and writing means 1; and a control means (corresponding to a control device 2) which controls the medium transfer means 5.

Figure 4:
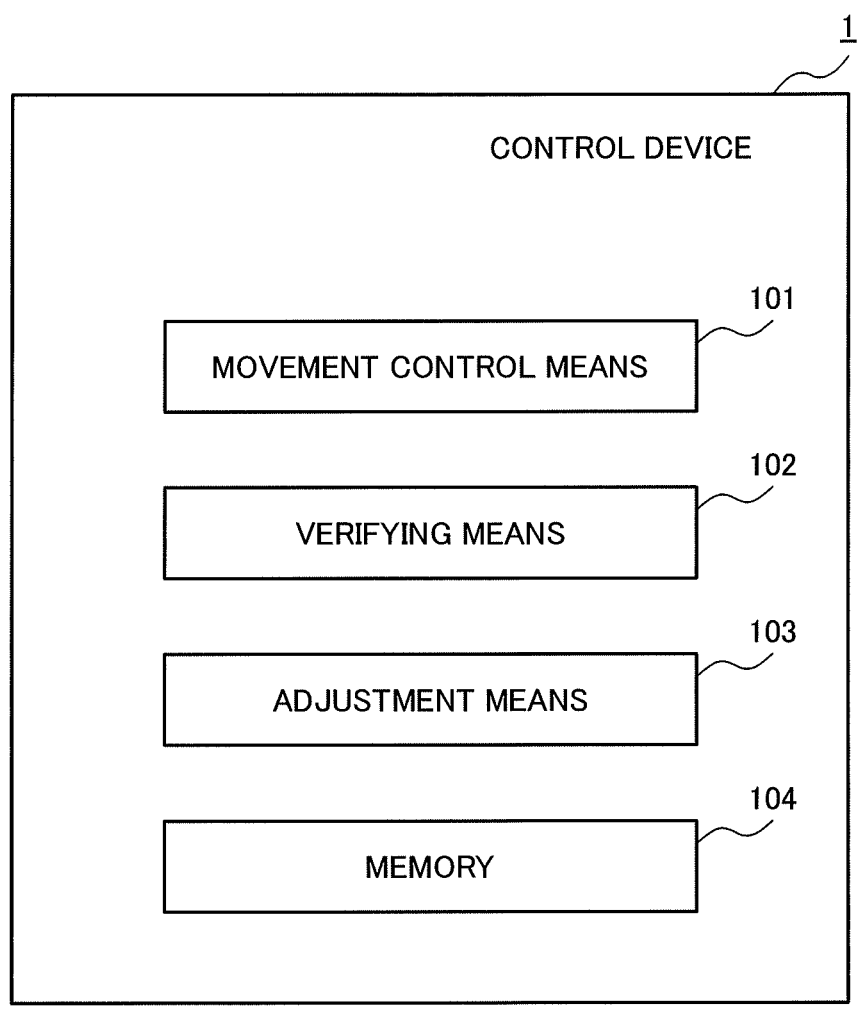
FIG. 4 is a diagram showing an exemplary configuration of the control apparatus 2 according to the present exemplary embodiment.

As shown in FIG. 4, the control means 2 of the library device 100 according to the present exemplary embodiment is configured including a movement control means 101, a verifying means 102 and an adjustment means 103.

By driving a stepping motor 51 shown in FIG. 3 by the number of pulses according to a movement distance of the medium transfer means 5, the movement control means 101 moves the medium transfer means 5.

The verifying means 102 verifies the movement distance of the medium transfer means 5 by comparing: an actual encoder count number counted by an encoder sensor 53 shown in FIG. 3 according to a movement of the medium transfer means 5 when the stepping motor 51 shown in FIG. 3 is driven by the number of pulses according to the movement distance of the medium transfer means 5; and an assumed encoder count number assumed based on the number of pulses according to the movement distance of the medium transfer means 5.

The adjustment means 103 determines a proof factor to be used when the assumed encoder count number assumed based on the number of pulses according to the movement distance of the medium transfer means 5 is calculated.

In the control means 2 of the library device 100 according to the present exemplary embodiment, the adjustment means 103 will determine a proof factor used on calculating an assumed encoder count number, assumed based on the number of pulses according to the movement distance of the medium transfer means 5. For this reason, because, even if the relation between the number of pulses of the stepping motor 51 and the encoder count number (the relation that the number of pulses of the stepping motor 51*proof factor=actual encoder count number) changes, the assumed encoder count number assumed based on the number of pulses according to the movement distance of the medium transfer means 5 can be calculated, then the verifying means 102 can verify the movement distance of the medium transfer means 5 by the encoder count number counted by the encoder sensor 53 based on the proof factor determined by the adjustment means 103. Hereinafter, the library device 100 according to the present exemplary embodiment will be described in detail with reference to the accompanying drawing.

<Exemplary Configuration of the Library Device 100>

First, an exemplary configuration of the library device 100 according to the present exemplary embodiment will be described with reference to FIG. 1 and FIG. 2. FIG. 1 is a diagram (top view), viewing the library device 100 from the top, and FIG. 2 is a diagram (side view), viewing the library device 100 from a side and the rear, and FIG. 2(a) is a diagram when seeing the library device 100 from a first side face shown in FIG. 1, and FIG. 2(b) is a diagram when seeing the library device 100 from a second side face shown in FIG. 1, and FIG. 2(c) is a diagram when seeing the library device 100 from the rear side shown in FIG. 1. Meanwhile, in FIG. 2(b), illustration of the accessor mechanism 5 is omitted.

The library device 100 according to the present exemplary embodiment is configured including the drive device 1, a control device 2, a power supply device 3, a backboard 4, the accessor mechanism 5, the magazine 6, the medium 7, a LAN connector 8 and an operation panel 9.

The magazine 6 is an example of a medium storing means for accommodating the medium 7. The magazine 6 according to the present exemplary embodiment has plural cells (parts separated by a dashed line) 11 and adopts the deep cell design method capable of accommodating two media 7 for each one cell 11. As shown in FIG. 2(b), the magazine 6 according to the present exemplary embodiment has three tiers of deep cells in the height direction (Y-direction) of the library device 100, and has five lines of deep cells in the depth direction (X-direction) of the library device 100. As shown in FIG. 1, the magazine 6 has a structure capable of being removed from the front side (front face side) of the library device 100.

The medium 7 is a computer-readable medium, such as, for example, a cartridge packing a magnetic tape.

The accessor mechanism 5 is an example of medium transfer means for transferring the medium 7. The accessor mechanism 5 according to the present exemplary embodiment can move from the rear side of the library device 100 to the front side as shown in FIG. 1, or move from the front side to the rear side of the library device 100 (X-direction of FIG. 1 and FIG. 2(b)).

As shown in FIG. 2(b), the accessor mechanism 5 can move from the bottom base side to the upper surface side of the library device 100, or move from the upper surface side to the bottom base side of the library device 100 (Y-direction of FIG. 2(b)).

Meanwhile, the library device 100 according to the present exemplary embodiment is configured such that a stepping motor is used as a motor which is used for moving the accessor mechanism 5 in X-direction of FIG. 1 and FIG. 2(b), a DC motor is used as a motor which is used for moving it in Y-direction of FIG. 2(b), and thus the movement of the accessor mechanism 5 is controlled using separate motors.

Also, when there is an instruction to read from or write into a predetermined medium 7, for example, the accessor mechanism 5 performs transferring the medium 7. Specifically, according to the instruction from the control device 2, the accessor mechanism 5 pulls the medium 7 designated by the control device 2 out from the magazine 6, transfers the pulled medium 7 to the drive device 1, and insert it in a slot 10. Then, when reading from or writing into the medium 7 ends, the accessor mechanism 5 pulls the medium 7 out from the slot 10 of the drive device 1, transfers the pulled medium 7 to the originally stored magazine 6, and put the medium 7 in the originally stored cell 11.

Meanwhile, in the deep cell method, when the designated medium 7 is stored in the back side (first side face of FIG. 1) of the cell 11, evacuation operation which makes the medium 7 stored in the front side of the cell 11 (second side face of FIG. 1) be evacuated into an idle cell temporarily is needed, and thus the accessor mechanism 5 will also perform the evacuation operation.

The drive device 1 is an example of a medium reading and writing means which reads information stored in the medium 7 and writes information in the medium 7. The drive device 1 according to the present exemplary embodiment reads data from the medium 7 put in the slot 10 or writes data in the medium 7. In the present exemplary embodiment, as shown in FIG. 2(b) and FIG. 2(c), two drive devices 1 are arranged in a manner being stacked up and down in the height direction of the library device 100 (Y-direction of FIG. 2(b) and (c)).

The control device 2 is an example of the control means which controls the library device 100. When instructions for reading or writing a medium 7 are accepted from a host or the like which is not illustrated, the control device 2 according to the present exemplary embodiment performs control such that the medium 7 stored in the magazine 6 is conveyed into the drive device 1 using the accessor mechanism 5, and the reading or writing processing for the medium 7 is performed by the drive device 1, and the medium 7 is stored again in the magazine 6.

The power supply device 3 is an example of a power supply means which supplies electricity for making the library device 100 operate.

The backboard 4 is an example of a connecting means which connects each equipment (device) in the library device 100 electrically. The backboard 4 according to the present exemplary embodiment is configured so that each of the drive device 1, the control device 2 and the power supply device 3 can be connected to the backboard 4. The LAN connector 8 and the operation panel 9 are configured so that they can be connected to the backboard 4 via a cable. Also, the accessor mechanism 5 is configured such that it can be connected to the front panel via a cable and relayed by the front panel to be connected to the backboard 4 finally.

The LAN connector 8 is a connector for connecting the library device 100 to a local area network.

The operation panel 9 accepts various kinds of operation and indicates various kinds of information.

As shown in FIG. 1 and FIG. 2(a), the library device 100 according to the present exemplary embodiment is configured so that the control device 2 and the power supply device 3 may be arranged along the first side face. Also, it is configured so that the backboard 4 may be arranged between the control device 2 and the power supply device 3. Meanwhile, it is configured so that the backboard 4 may be arranged in an almost midsection in the depth direction (X-direction) of the library device 100.

Also, as shown in FIG. 1, the library device 100 according to the present exemplary embodiment is configured so that the magazine 6 may be attached next to the control device 2, the backboard 4 and the power supply device 3 arranged along the first side face, and, in addition, the drive device 1 may be arranged next to the power supply device 3. That is, the drive device 1 is configured so that the doorway (insertion and removal gate) for the medium 7 in the slot 10 may face in the direction toward the second side face.

As shown in FIG. 1, the library device 100 according to the present exemplary embodiment is configured so that the doorway (insertion and removal gate) for the medium 7 in each deep cell of the magazine 6 may face in the direction toward the second side face. Further, it is configured so that the doorway for the medium 7 in the slot 10 and the doorway for the medium 7 in each deep cell may be in parallel with each other.

As shown in FIG. 1, the library device 100 according to the present exemplary embodiment is configured so that the accessor mechanism 5 may be arranged in the second side face. Also, it is configured so that a space which is a movable range of the accessor mechanism 5 (movable scope in X-direction of the library device 100) may be provided along the second side face. In the library device 100 according to the present exemplary embodiment, the doorway for the medium 7 in the slot 10 and the doorway for the medium 7 in each deep cell face in the direction to this space, and the accessor mechanism 5 inserts and removes the medium 7 from those doorways.

As shown in FIG. 1, the library device 100 according to the present exemplary embodiment is configured so that it may have only one backboard 4, and the control device 2, the power supply device 3 and the drive device 1 may be connected to the backboard 4 directly. That is, it is configured so that one backboard 4 may be shared by three devices 2, 3 and 1.

The three devices 2, 3 and 1 have a structure such that they can be attached to and detached from the backboard 4, and the control device 2 has a structure such that it can be attached to and detached from the backboard 4 from the front side of the library device 100. For example, as shown in FIG. 1, the control device 2 is configured so that it can be pulled out toward the front side (direction of the arrow in FIG. 1). The power supply device 3 and the drive device 1 have structures such that they can be attached to and detached from the backboard 4 from the rear side of the library device 100. For example, as shown in FIG. 1, the power supply device 3 and the drive device 1 are configured so that they may be pulled out toward the rear side (direction of the arrow in FIG. 1).

<Exemplary Schematic Configuration Inside the Accessor Mechanism 5>

Figure 3A:
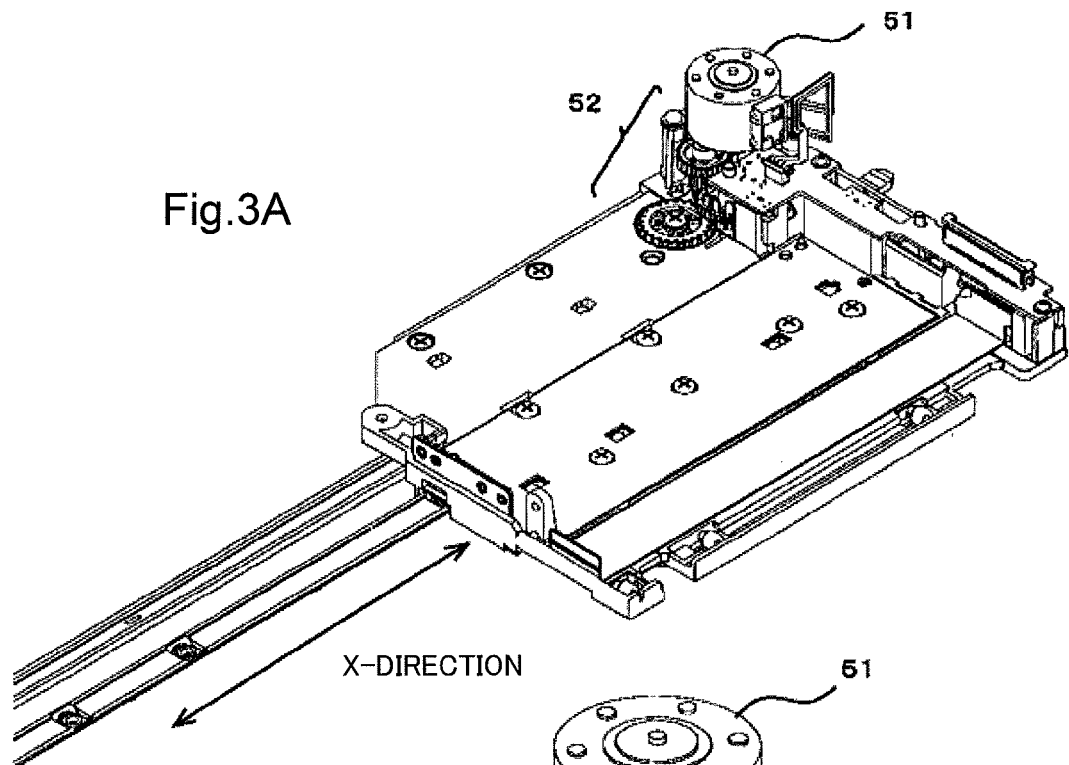
FIG. 3 is a diagram showing a schematic exemplary configuration of the accessor mechanism 5.
Figure 3B:
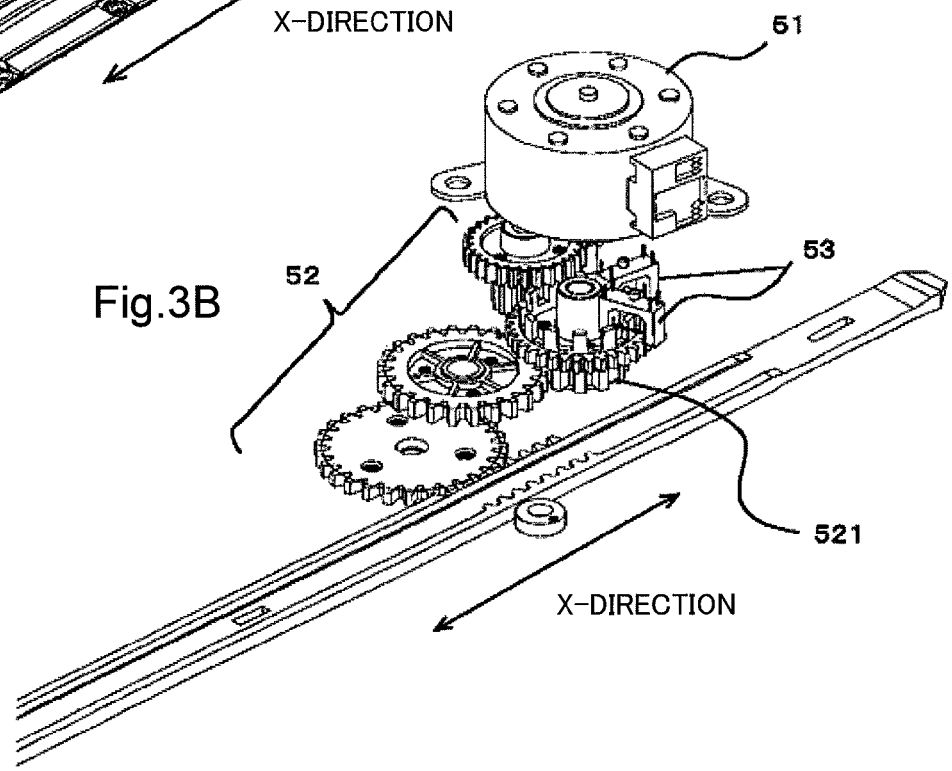

Next, an exemplary schematic configuration of the inside of the accessor mechanism 5 will be described with reference to FIG. 3. FIG. 3 is a diagram showing an exemplary schematic configuration inside the accessor mechanism 5, and it indicates an exemplary driving configuration when moving the accessor mechanism 5 in X-direction as shown in FIG. 1. FIG. 3(a) indicates an exemplary schematic configuration inside the accessor mechanism 5, and FIG. 3(b) indicates an expanded exemplary configuration of the part including the stepping motor 51 and a plurality of gears 52 in FIG. 3(a).

As shown in FIGS. 3(a) and (b), the accessor mechanism 5 has the stepping motor 51 and the plurality of gears 52, and the plurality of gears 52 rotate along with rotation of the stepping motor 51, and the accessor mechanism 5 will move in X-direction shown in FIG. 1 and FIGS. 3(a) and (b). As shown in FIG. 3(b), the encoder sensor 53 is installed in a certain gear 521 among gears of which the accessor mechanism 5 is configured, and the control device 2 will acquire the encoder count number counted by the encoder sensor 53.

The encoder sensor 53 according to the present exemplary embodiment is a publicly known encoder sensor, and is configured having a light-emitting part which emits light and a light accepting part which receives light. In the encoder sensor 53 according to the present exemplary embodiment, light emitted by the light-emitting part passes through a slit provided in the certain gear 521, and, by the light accepting part receiving light which has passed through the slit, the encoder sensor 53 generates output signals of High and Low, and the encoder count number will be counted based on the output signal. In the present exemplary embodiment, as shown in FIG. 3(b), two encoder sensors 53 are provided in the certain gear 521, the control device 2 acquires encoder count numbers counted by the two encoder sensors 53, and the control device 2 shifts the phases of the two encoder sensors 53 and acquires a highly accurate encoder count number.

Meanwhile, in FIG. 3(b), it has been arranged such that two encoder sensors 53 are provided in the certain gear 521, the control device 2 acquires the encoder count numbers counted by the two sensors 53, and the control device 2 acquires a highly accurate encoder count number using encoder count numbers acquired from the two sensors 53. However, a configuration, in which one encoder sensor 53 is provided in the certain gear 521, and the control device 2 acquires the encoder count number counted by that one encoder sensor 53, is also possible.

<Exemplary Inside Configuration of the Control Device 2>

Next, an exemplary inside configuration of the control device 2 according to the present exemplary embodiment will be described with reference to FIG. 4.

The control device 2 according to the present exemplary embodiment is configured including the movement control means 101, the verifying means 102, the adjustment means 103 and a memory 104. The movement control means 101, the verifying means 102 and the adjustment means 103 can be realized by one piece of firmware.

The movement control means 101 controls movement of the accessor mechanism 5. By driving the stepping motor 51 shown in FIG. 3 by the number of pulses according to the movement distance of the accessor mechanism 5, the movement control means 101 moves the accessor mechanism 5.

The verifying means 102 verifies the movement distance of the accessor mechanism 5. When the stepping motor 51 shown in FIG. 3 has been driven by the number of pulses according to the movement distance of the accessor mechanism 5, the verifying means 102 compares the encoder count number counted actually by the encoder sensor 53 shown in FIG. 3 according to the movement of the accessor mechanism 5 and the assumed encoder count number assumed based on the number of pulses according to the movement distance of the accessor mechanism 5 to verify the movement distance of the accessor mechanism 5. The assumed encoder count number will be such that the number of pulses according to the movement distance of the accessor mechanism 5*proof factor=assumed encoder count number.

The adjustment means 103 determines the proof factor to be used when the encoder count number that is assumed based on the number of pulses according to the movement distance of the accessor mechanism 5 is calculated. The adjustment means 103 determines the above-mentioned proof factor when the library device 100 is powered on, for example. As a result, the verifying means 102 can calculate, based on the proof factor determined by the adjustment means 103, the encoder count number assumed based on the number of pulses according to the movement distance of the accessor mechanism 5, and verify the movement distance of the accessor mechanism 5 by comparing the assumed encoder count number that has been calculated and the encoder count number counted actually by the encoder sensor 53 shown in FIG. 3 according to the movement of the accessor mechanism 5. Meanwhile, determination of the proof factor performed by the adjustment means 103 is not limited to the timing when the library device 100 is powered on, and it can be performed at an arbitrary timing.

The memory 104 manages various kinds of information used by the control device 2.

<Example of Processing Operations of the Library Device 100>

Figure 5:
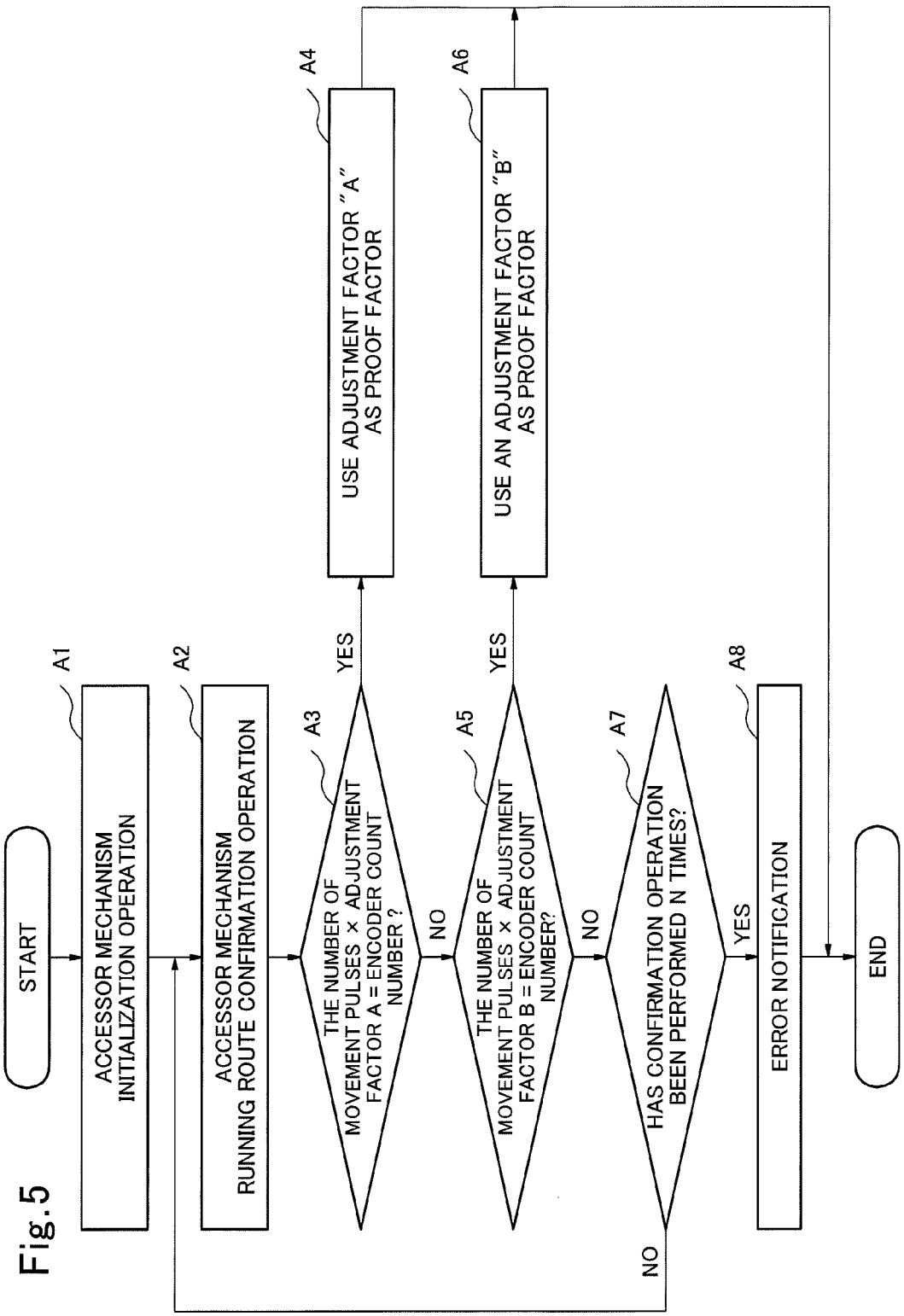
FIG. 5 is a diagram showing a processing example of operations on power-ON of the library device 100 according to the present exemplary embodiment.

Next, an example of processing operations of the library device 100 according to the present exemplary embodiment will be described with reference to FIG. 5 and FIG. 6. FIG. 5 indicates an example of processing operations when the library device 100 is powered on, and FIG. 6 indicates an example of processing operations at the time of the designated position verification operation for the accessor mechanism 5. The designated position verification operation is performed at the time of the normal operation for the library device 100.

<Example of Processing Operations when the Library Device 100 is Powered On>

First, an example of processing operations when the library device 100 is powered on will be described with reference to FIG. 5.

When the power of the library device 100 is turned on, the control device 2 performs the initialization operation of the accessor mechanism 5 (Step A1). Because the initialization operation is a publicly known operation, description of the processing in detail is omitted. On this occasion, the control device 2 initializes the encoder count number counted by the encoder sensor 53, and sets the encoder count number to 0.

Next, the movement control means 101 performs a running route confirmation operation of the accessor mechanism 5, and confirms whether or not there is an obstacle in a running route of the accessor mechanism 5 (Step A2). The running route confirmation operation moves the accessor mechanism 5 from the position of the home position (position of A shown in FIG. 1) to the final position of the farthest medium 7 (position of B shown in FIG. 1), and confirms whether or not there is an obstacle in the running route from the position A that is the home position to the final position B.

Because the control device 2 has been managing the number of movement pulses required for moving the accessor mechanism 5 from the position A of the home position to the final position B in the memory 104 in advance, the movement control means 101 will perform the running route confirmation operation by driving the stepping motor 51 by the number of movement pulses being managed in the memory 104 to move the accessor mechanism 5 from the position A of the home position to the final position B.

Meanwhile, the adjustment means 103 acquires the encoder count number counted by the encoder sensor 53 until the time when the stepping motor 51 has been driven by the number of movement pulses, and determines the adjustment factor used as the proof factor based on the number of movement pulses and the encoder count number (Steps A3-A6). The proof factor is a factor used when the verifying means 102 calculates the above-mentioned assumed encoder count number in the processing of the designated position verification operation mentioned later.

In the present exemplary embodiment, the control device 2 keeps a plurality of adjustment factors (adjustment factor A and adjustment factor B) used as the proof factor in the memory 104 under management in advance (in this regard, however, the adjustment factor A is different from the adjustment factor B), and the adjustment means 103 determines, based on the number of movement pulses, the encoder count number and the plurality of adjustment factors managed in the memory 104 (adjustment factor A and adjustment factor B), an adjustment factor used as the proof factor (Steps A3-A6).

Specifically, the adjustment means 103 determines whether or not the relation between the number of movement pulses, the encoder count number and the adjustment factor A satisfies the following formula 1 or not (Step A3).

$$\text{The number of movement pulses*adjustment factor A=encoder count number} \quad \text{(Formula 1)}$$

When the above condition of Formula 1 is satisfied (step A3/Yes), the adjustment means 103 determines to use the adjustment factor A as the proof factor (Step A4), and ends processing (End).

When the condition of the above Formula 1 is not satisfied (step A3/No), it then determines whether the relation between the number of movement pulses, the encoder count number and the adjustment factor B satisfies the following formula 2 (step A5).

$$\text{The number of movement pulses*adjustment factor B=encoder count number} \quad \text{(Formula 2)}$$

When the condition of the above Formula 2 is satisfied (step A5/Yes), the adjustment means 103 determines to use the adjustment factor B as a proof factor (Step A6), and ends processing (End).

When the condition of the above Formula 2 is not satisfied (step A5/No), the adjustment means 103 determines whether or not the movement control means 101 has performed the running route confirmation operation N (N is an arbitrary integer) times (Step A7) and, when having not performed the running route confirmation operation N times (step A7/No), the movement control means 101 performs the running route confirmation operation again (Step A2), the adjustment means 103 acquires the encoder count number which has been counted by the encoder sensor 53 until the time when the stepping motor 51 has been driven by the number of movement pulses, and, based on the number of movement pulses and the encoder count number, determines the adjustment factor used as the proof factor (Steps A3-A6).

When the movement control means 101 cannot determine the adjustment factor used as the proof factor even if the running route confirmation operation has been performed N times (step A7/Yes), the adjustment means 103 performs the error notification (Step A8) and ends processing (End). As the error notification, processing such as notifying a user to the effect that the proof factor cannot be determined will be performed.

<Specific Example at the Time of Determining the Proof Factor>

Next, a specific example at the time of determining the proof factor mentioned above will be described.

For example, it is supposed that there is the accessor mechanism 5 for which the adjustment factor A of Formula 1 is 0.8 and the adjustment factor B of Formula 2 is 0.9. Also, it is supposed that the number of movement pulses required for moving the accessor mechanism 5 from the position of the home position (position of A shown in FIG. 1) to the final position of the farthest medium 7 (position of B shown in FIG. 1) is 1000 pulses.

The adjustment means 103 acquires the encoder count number counted by the encoder sensor 53 until the time when the stepping motor 51 is driven taking the number of movement pulses as 1000 pulses, and it is supposed that the encoder count number which has been acquired is 900. In this case, the relation between the number of movement pulses and an encoder count number will be the number of movement pulses (1000)*adjustment factor B (0.9)=encoder count number (900) and it satisfies the condition of the above-mentioned Formula 2, the adjustment factor B is determined to be used as the proof factor.

According to the above, the adjustment means 103 can determine the adjustment factor used as the proof factor based on the relation between a count number that has been counted by the encoder sensor 53 until the time when the stepping motor 51 is driven by the number of movement pulses and that number of the movement pulses.

Meanwhile, in the above-mentioned processing, it has been arranged such that the adjustment factor used as the proof factor is determined using the number of movement pulses required for moving the accessor mechanism 5 from the position A of the home position to the final position B. However, the number of pulses which is used when the adjustment factor used as the proof factor is determined is not limited to the number of movement pulses mentioned above, and it is possible to determine the adjustment factor used as the proof factor using the predetermined number of pulses required for moving the accessor mechanism 5 from the position A of the home position to a predetermined position. In this case, the encoder count number, which is counted by the encoder sensor 53 until the time when the stepping motor 51 is driven by the predetermined number of pulses required for moving the accessor mechanism 5 from the position A of the home position to a predetermined position, is acquired, and the adjustment factor used as the proof factor is determined based on the above predetermined number of pulses and the encoder count number.

<Example of Processing Operations at the Time of a Designated Position Verification Operation of the Accessor Mechanism 5>

Next, an example of processing operations at the time of a designated position verification operation of the accessor mechanism 5 will be described with reference to FIG. 6.

In the control device 2, when instructions to move the accessor mechanism 5 are accepted during the normal operation, the movement control means 101 performs the designated position movement operation to move the accessor mechanism 5 to the designated position (position of a cell 11 designated from the user) accepted by the movement instructions (Step B1).

Because the control device 2 has managed the number of pulses required for moving the accessor mechanism 5 from the position A of the home position to the designated position (position of each cell 11) in the memory 104 in advance, the movement control means 101 will perform the designated position movement operation by driving the stepping motor 51 by the number of pulses required for moving it from the position A of the home position to the designated position, to move the accessor mechanism 5 from the position A of the home position to the designated position.

Meanwhile, the verifying means 102 acquires the encoder count number which has been counted by the encoder sensor 53 until the time when the stepping motor 51 has been driven by the number of pulses required for moving it to the designated position, performs, based on the number of pulses required for moving the accessor mechanism 5 to the designated position and the encoder count number, designated position verification of the accessor mechanism 5 using the following Formula 3, and confirms whether there is a correlation between the number of pulses required for moving it to the designated position and the encoder count number (Step B2). However, a proof factor X of the following Formula 3 uses the adjustment factor which the adjustment means 103 has determined as the proof factor by the processing of FIG. 5 (in the specific example mentioned above, the adjustment factor B).

The number of pulses required for moving to a designated position*proof factor X=encoder count number (Formula 3)

When the condition of the above-mentioned Formula 3 is satisfied (step B2/Yes), the verifying means 102 judges that there is a correlation between the number of pulses required for moving the accessor mechanism 5 to the designated position and the encoder count number, determines that it has moved to the designated position, and ends processing (End).

That is, because the encoder count number obtained by the number of pulses required for moving to the designated position*proof factor X indicated by the above-mentioned Formula 3 will be an assumed encoder count number, when the condition of the above-mentioned Formula 3 is satisfied, the encoder count number counted by the encoder sensor 53 will be identical to the assumed encoder count number. For this reason, when the condition of the above-mentioned Formula 3 is satisfied, the verifying means 102 can judge that there is a correlation between the number of pulses required for moving to the designated position and the encoder count number, and determine that the accessor mechanism 5 has been moved to the designated position.

When the condition of the above-mentioned Formula 3 is not satisfied (step B2/No), the verifying means 102 judges that there are no correlations between the number of pulses required for moving to the designated position and the encoder count number, and determines that the accessor mechanism 5 has not moved to the designated position.

That is, when the condition of the above-mentioned Formula 3 is not satisfied, the encoder count number counted by the encoder sensor 53 will not be identical to the assumed encoder count number. For this reason, when the condition of the above-mentioned Formula 3 is not satisfied, the verifying means 102 judges that there are no correlations between the number of pulses required for moving to the designated position and the encoder count number, and can determine that the accessor mechanism 5 has not moved to the designated position.

In this case, the verifying means 102 judges whether the movement control means 101 has performed the designated position movement operation N times (N is an arbitrary integer) (Step B3), and, when having not performed N times (step B3/No), the movement control means 101 performs the designated position movement operation again (Step B1) and the verifying means 102 acquires the encoder count number which has been counted by the encoder sensor 53 until the time when the stepping motor 51 has been driven by the number of pulses required for moving to the designated position, and confirms whether there is a correlation between the number of pulses acquired and the encoder count number (Step B2).

When the movement control means 101 determines that the condition of the above-mentioned Formula 3 could not be satisfied in spite of performing the designated position movement operation N times and thus there is no correlation between the number of pulses required for moving to the designated position and the encoder count number (step B3/Yes), the verifying means 102 performs the error notification (Step B4) and ends processing (End). As the error notification, processing for notifying the user that the accessor mechanism 5 cannot be moved to the designated position will be performed.

<Action and Effect of the Library Device 100 According to the Present Exemplary Embodiment>

Thus, the control device 2 of the library device 100 according to the present exemplary embodiment manages the plurality of adjustment factors (the adjustment factor A and the adjustment factor B; in this regard, however, the adjustment factor A is different from the adjustment factor B) in the memory 104 in advance. Then, the movement control means 101 drives the stepping motor 51 by the number of movement pulses set in advance and performs the running route confirmation operation, and, at the same time, the adjustment means 103 acquires the encoder count number which has been counted by the encoder sensor 53 until when the stepping motor 51 is driven by the number of movement pulses. The adjustment means 103 determines the adjustment factor, by which the relation between the number of movement pulses and the encoder count number becomes the relation that the number of movement pulses*adjustment factor=encoder coder count number, from the plurality of adjustment factors (the adjustment factor A and the adjustment factor B) managed in the memory 104 or the like of the control device 2, and determines the determined adjustment factor as the proof factor.

As a result, in the library device 100 according to the present exemplary embodiment, because the adjustment means 103 will adjust the proof factor X even when the relation between the number of pulses of the stepping motor 51 required for moving to the designated position and the encoder count number (the relation that the number of pulses required for moving to the designated position*proof factor X=actual encoder count number) has been changed, the verifying means 102 can verify the movement distance of the accessor mechanism 5 by the encoder count number that has been counted by the encoder sensor 53.

In addition, in the library device 100 according to the present exemplary embodiment, because the movement control means 101, the verifying means 102 and the adjustment means 103 can be realized by one piece of firmware, the movement control of the accessor mechanism 5 can be realized by the one piece of firmware. Further, the library device 100 according to the present exemplary embodiment can adjust the relation between the number of pulses required for moving to the designated position and the encoder count number without changing the hardware configuration.

Meanwhile, the exemplary embodiment mentioned above is a preferred exemplary embodiment of the present invention, and the scope of the present invention is not limited only to the above-mentioned exemplary embodiment, and the present invention can be carried out in a form in which various changes are made within a range that does not deviate from the point of the present invention.

For example, in the exemplary embodiment mentioned above, the control device 2 has been described about the movement control in X-direction of the accessor mechanism 5 shown in FIG. 1. However, when the stepping motor is also used for movement control in Y-direction of the accessor mechanism 5 shown in FIG. 2, the same control as the movement control of X-direction can be performed.

Figure 6:
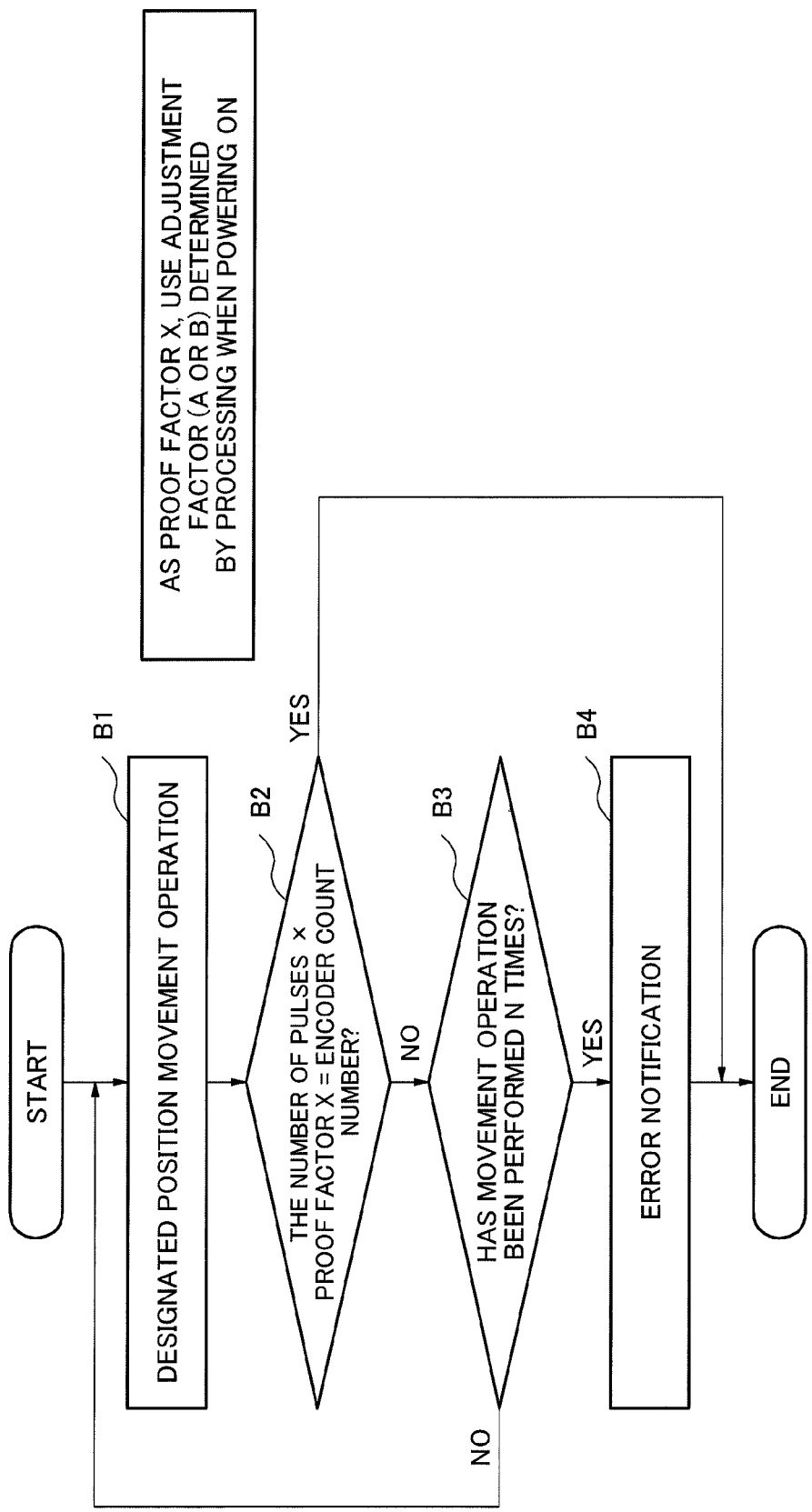
FIG. 6 is a diagram showing a processing example of operations at the time of a designated position confirmation operation for the accessor mechanism 5.
Figure 7:
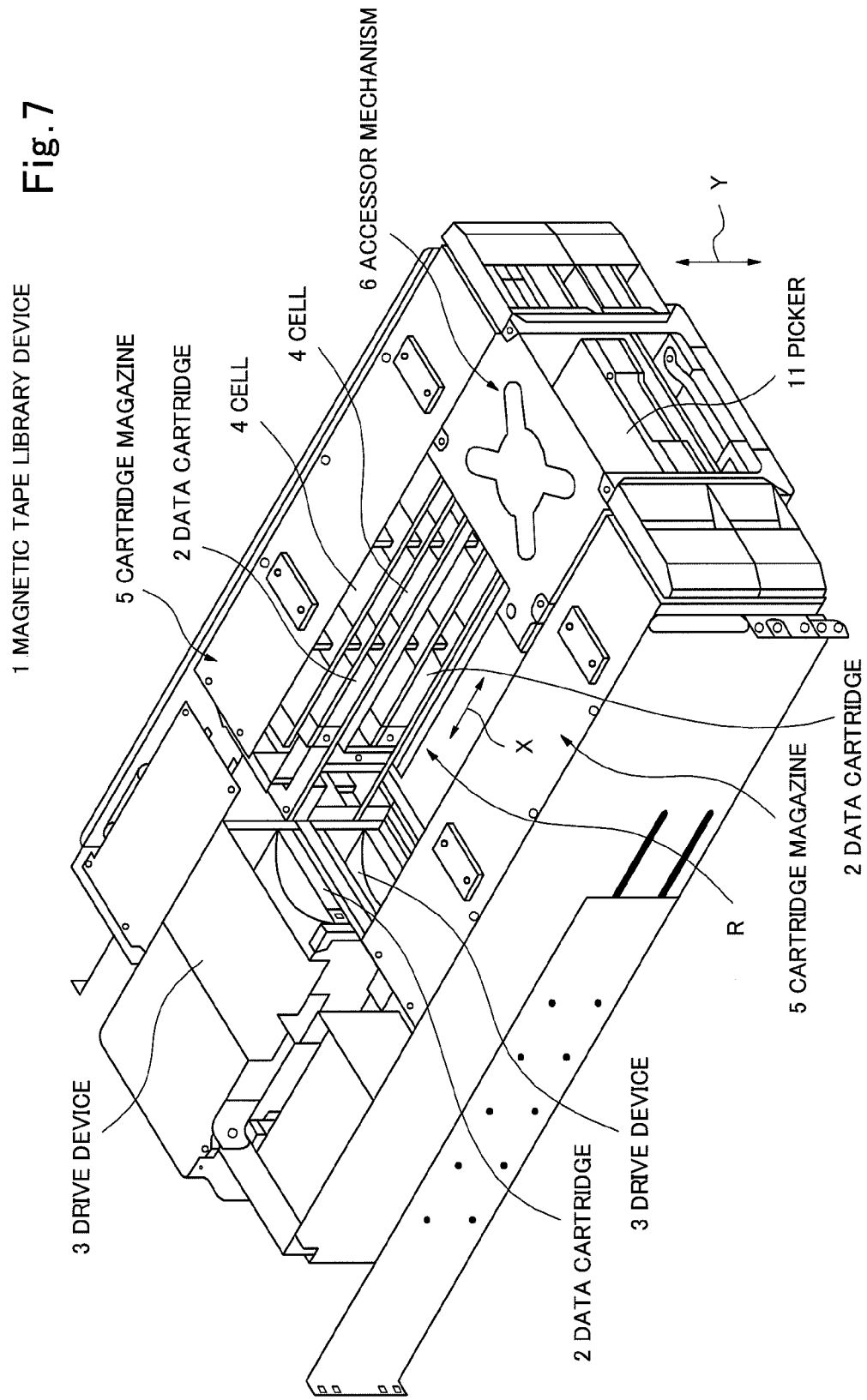
FIG. 7 is a diagram showing an exemplary configuration of a library device related to the present invention.

Also, according to the exemplary embodiment mentioned above, the adjustment means 103 is arranged such that it performs the processing operations shown in FIG. 5 at the time of the power-ON of the library device 100 and determines the adjustment factor used as the proof factor, and the verifying means 102 performs the designated position verification operation shown in FIG. 6 using the proof factor determined by the adjustment means 103. However, the timing when the adjustment factor used as the proof factor is determined is not limited to the timing when the library device 100 is power-ON, and it can be performed at an arbitrary timing. For example, it can be arranged such that, when determination start instructions for the adjustment factor used as the proof factor is accepted from the operation panel 9 or the like, the adjustment means 103 performs the processing operations shown in FIG. 5. It is also possible that, when the error notification of Step B4 is going to be performed in the processing operations shown in FIG. 6, the adjustment means 103 performs the processing operations shown in FIG. 5 automatically. That is, the adjustment means 103 can adjust the proof factor before the verifying means 102 uses it, or can adjust the proof factor after the verifying means 102 has used it.

Further, the control operation in each device constituting the library device 100 in the present exemplary embodiment mentioned above can be carried out using hardware or software or a combined structure of the both.

Meanwhile, when processing is carried out using software, it is possible to install a program recording processing sequences in a memory in a computer incorporated in exclusive hardware. Or, it is possible to install the program on a general-purpose computer which can carry out various kinds of processing to execute it.

For example, the program can be recorded in a hard disk and ROM (Read Only Memory) as a recording medium in advance. Or, the program can be stored (record) in a removable recording medium temporarily or permanently. Such removable recording medium is possible to be provided as so-called packaged software. Meanwhile, as the removable recording medium, a floppy (registered trademark) disk, CD-ROM (Compact Disc Read Only Memory), an MO (Magneto optical) disc, a DVD (Digital Versatile Disc), a magnetic disk and a semiconductor memory are cited.

Meanwhile, the program will be installed in the computer from the removable recording medium mentioned above. Or, it will be wirelessly transmitted to the computer from a download site. Or, it will be transmitted to the computer by a wire via a network.

The library device 100 in the present exemplary embodiment can be constructed not only such that it is carried out in a time series manner according to the processing operations described in the above-mentioned exemplary embodiment, but also such that it is carried out in parallel or separately according to the processing capability of a device carrying out the processing or as necessary.

This application claims priority based on Japanese patent application number 2010-068020 filed on Mar. 24, 2010, the disclosure of which is incorporated herein in its entirety.

REFERENCE SIGNS LIST

100 Library device
1 Drive device
2 Control device
2 Power supply device
4 Backboard
5 Accessor mechanism
6 Magazine
7 Medium
8 LAN connector
9 Operation panel
51 Stepping motor
52 Gear
53 Encode sensor
101 Movement control means
102 Verifying means
103 Adjustment means
104 Memory (management means)

The invention claimed is:

1. A library device, comprising:
a medium storing unit that can accommodate a plurality of computer-readable media;
a medium reading and writing unit that performs at least one of reading information stored in said medium and writing information in said medium;
a medium transfer unit that transfers said medium between said medium storing unit and said medium reading and writing unit; and
a control unit that controls said medium transfer unit, and comprises:
a movement control unit that moves said medium transfer unit by driving a stepping motor by a number of pulses according to a movement distance of said medium transfer unit;
a verifying unit that compares an actual encoder count number counted, upon said stepping motor having been driven by said number of pulses, by an encoder sensor according to a movement of said medium transfer unit, and an assumed encoder count number assumed based on said number of pulses; and
an adjustment unit that determines a proof factor used at a time of calculating the assumed encoder count number assumed based on said number of pulses.

2. The library device according to claim 1, wherein said adjustment unit determines said proof factor based on a relation between a count number counted by said encoder sensor until a time when said stepping motor is driven by a predetermined number of pulses and said predetermined number of pulses.

3. The library device according to claim 2, wherein
the assumed encoder count number assumed based on said number of pulses has a relation that
said number of pulses * said proof factor =said assumed encoder count number, and wherein
said adjustment unit determines an adjustment factor, by which said count number is related to said predetermined number of pulses according to a relation that said predetermined number of pulses * adjustment factor = said count number, as said proof factor.

4. The library device according to claim 3, further comprising:
a management unit that manages a plurality of said adjustment factors, wherein
said adjustment unit determines said adjustment factor, by which said count number is related to said predetermined number of pulses according to a relation that said predetermined number of pulses * adjustment factor = said count number, from a plurality of said adjustment factors managed by said management unit.

5. A library device, comprising:
a medium storing unit that can accommodate a plurality of computer-readable media;
a medium reading and writing unit that performs at least one of reading information stored in said medium and writing information in said medium;
a medium transfer unit that transfers said medium between said medium storing unit and said medium reading and writing unit; and
a control unit that moves said medium transfer unit by driving a stepping motor by a number of pulses according to a movement distance of said medium transfer unit, and includes:
an adjustment unit that determines, upon accepting an adjustment instruction, a proof factor used at a time of calculating an assumed encoder count number assumed based on the number of pulses according to the movement distance of said medium transfer unit; and
a verifying unit that compares, upon verifying said movement distance of said medium transfer unit, the assumed encoder count number assumed based on said proof factor determined by said adjustment unit and the number of pulses according to the movement distance of said medium transfer unit, and an actual encoder count number counted, upon said stepping motor having been driven by the number of pulses according to the movement distance of said medium transfer unit, by an encoder sensor.

6. A control method for controlling a library device, which comprises a medium storing unit than can accommodate a plurality of computer-readable media, a medium reading and writing unit that performs at least one of reading information stored in said medium and writing information in said medium, a medium transfer unit that transfers said medium between said medium storing unit and said medium reading and writing unit, and a control unit that controls said medium transfer unit, said control method comprising:
moving said medium transfer unit by driving a stepping motor by a number of pulses according to a movement distance of said medium transfer unit;
comparing an actual encoder count number counted, upon said stepping motor having been driven by said number of pulses, according to a movement of said medium transfer unit, and an assumed encoder count number assumed based on said number of pulses; and
determining a proof factor used at a time of calculating the assumed encoder count number assumed based on said number of pulses.

7. A non-transitory computer readable medium storing a program, causing a computer to execute a control process for controlling a library device, which comprises a medium storing unit that can accommodate a plurality of computer-readable media, a medium reading and writing unit that performs at least one of reading information stored in said medium and writing information in said medium, a medium transfer unit that transfers said medium between said medium storing unit and said medium reading and writing unit, and a control unit that controls said medium transfer unit, said control process comprising:
moving said medium transfer unit by driving a stepping motor by a number of pulses according to a movement distance of said medium transfer unit;
comparing an actual encoder count number counted, upon said stepping motor having been driven by said number of pulses, according to a movement of said medium transfer unit, and an assumed encoder count number assumed based on said number of pulses; and
determining a proof factor used at a time of calculating the assumed encoder count number assumed based on said number of pulses.

8. A library device, comprising:
a medium storing means that can accommodate a plurality of computer-readable media;
a medium reading and writing means for performing at least one of reading information stored in said medium and writing information in said medium;
a medium transfer means for transferring said medium between said medium storing means and said medium reading and writing means; and
a control means for controlling said medium transfer means, and comprising:
a movement control means for moving said medium transfer means by driving a stepping motor by a number of pulses according to a movement distance of said medium transfer means;
a verifying means for comparing an actual encoder count number counted, upon said stepping motor having been driven by said number of pulses, by an encoder sensor according to a movement of said medium transfer means, and an assumed encoder count number assumed based on said number of pulses; and
an adjustment means for determining a proof factor used at a time of calculating the assumed encoder count number assumed based on said number of pulses.

9. A library device, comprising:
a medium storing means that can accommodate a plurality of computer-readable media;
a medium reading and writing means for performing at least one of reading information stored in said medium and writing information in said medium;
a medium transfer means for transferring said medium between said medium storing means and said medium reading and writing means; and
a control means for moving said medium transfer means by driving a stepping motor by a number of pulses according to a movement distance of said medium transfer means, and including:
an adjustment means for determining, upon accepting an adjustment instruction, a proof factor used at a time of calculating an assumed encoder count number assumed based on the number of pulses according to the movement distance of said medium transfer means; and a verifying means for comparing, upon verifying said movement distance of said medium transfer means, the assumed encoder count number assumed based on said proof factor determined by said adjustment means and the number of pulses according to the movement distance of said medium transfer means, and an actual encoder count number counted, upon said stepping motor having been driven by the number of pulses according to the movement distance of said medium transfer means, by an encoder sensor.

* * * * *

UNITED STATES PATENT AND TRADEMARK OFFICE
CERTIFICATE OF CORRECTION

| | | |
|---|---|---|
| PATENT NO. | : 8,953,270 B2 | Page 1 of 1 |
| APPLICATION NO. | : 13/636424 | |
| DATED | : February 10, 2015 | |
| INVENTOR(S) | : Takeshi Suzuki et al. | |

It is certified that error appears in the above-identified patent and that said Letters Patent is hereby corrected as shown below:

ON THE TITLE PAGE

Column 2 (Attorney, Agent or Firm): Delete "Sugrue Mion, PLLC" and insert -- Sughrue Mion, PLLC --

IN THE CLAIMS

Column 16, Line 25: Delete "2" and insert -- 3 --

Signed and Sealed this
Twenty-second Day of December, 2015

Michelle K. Lee
*Director of the United States Patent and Trademark Office*